United States Patent [19]
Watts

[11] Patent Number: 6,160,389
[45] Date of Patent: Dec. 12, 2000

[54] BATTERY CHARGER WITH LOW HEAT DISSIPATION

[75] Inventor: Fred S. Watts, Shrewsbury, Pa.

[73] Assignee: Black & Decker Inc., Newark, Del.

[21] Appl. No.: 09/384,155

[22] Filed: Aug. 27, 1999

[51] Int. Cl.$^7$ ............................. G05F 1/56; H01M 10/44
[52] U.S. Cl. ............................................. 323/282; 320/21
[58] Field of Search .................................. 323/270, 271, 323/273, 274, 277, 282, 284, 285; 320/2, 4, 21, 27, 51, 53, DIG. 1

[56] References Cited

U.S. PATENT DOCUMENTS

| | | |
|---|---|---|
| 3,041,521 | 6/1962 | Ragosch et al. . |
| 3,624,481 | 11/1971 | Macharg . |
| 4,712,055 | 12/1987 | Houser, Jr. . |
| 4,853,607 | 8/1989 | Walter et al. . |
| 4,862,013 | 8/1989 | Konopka ................................. 307/254 |
| 5,043,650 | 8/1991 | Bhagwat et al. ........................... 320/39 |
| 5,095,260 | 3/1992 | Whiting . |
| 5,184,059 | 2/1993 | Patino et al. . |
| 5,291,383 | 3/1994 | Oughton .................................... 363/17 |
| 5,563,495 | 10/1996 | Tomiyori et al. . |
| 5,563,496 | 10/1996 | McClure . |
| 5,642,027 | 6/1997 | Windes et al. ............................... 320/1 |
| 5,708,350 | 1/1998 | Tibbs . |
| 5,708,351 | 1/1998 | Takamoro ................................. 320/3 J |
| 5,744,937 | 4/1998 | Cheon . |
| 5,751,139 | 5/1998 | Jordan et al. . |
| 5,805,433 | 9/1998 | Wood . |

Primary Examiner—Matthew Nguyen
Attorney, Agent, or Firm—Harness, Dickey & Pierce, P.L.C.

[57] ABSTRACT

A battery charger (14) with low heat generation for charging exothermic batteries (12) such as NiMH batteries, as well as endothermic batteries. Energy from a power source is chopped and filtered to provide a controlled charging current. The circuit (14) includes a series switch (34), bootstrap network (56), energy storage circuit (61), and an output inductor (40) having an auxiliary winding (38). The energy storage circuit (61) supplies power to the series switch (34). The bootstrap network (56) provides a path for energy from the power source to the energy storage circuit (61). Power dissipation in the bootstrap network (56) is minimized by supplementing local energy storage with energy coupled from the auxiliary winding (38) of the inductor (40). Both variable frequency or fixed frequency modulation techniques can be employed to drive the series switch (34). Hysteretic charge current control combined with energy coupled from the output inductor (40) is one method to minimize circuit power dissipation and subsequent heat generation.

19 Claims, 4 Drawing Sheets

BATTERY CHARGER WITH LOW HEAT DISSIPATION

BACKGROUND AND SUMMARY OF THE INVENTION

The present invention relates generally to charging circuits for charging batteries. More particularly, the invention relates to an efficient battery charger for charging batteries that are sensitive to high temperatures during charging.

Over the past couple of decades the use of portable electronic devices has increased dramatically. Most portable devices are powered by either primary batteries such as alkalines, or by rechargeable batteries such as NiCad and lead-acid. Primary batteries are capable of powering portable devices for long periods of time, but are useless after the charge stored in them has been depleted. Rechargeable batteries, on the other hand, can be reused multiple times after being charged, but they are only capable of powering devices for relatively short periods of time. This has stimulated research into the development of rechargeable batteries that are capable of powering devices for longer periods of time. The research has led to the development of Nickel Metal Hydride (NiMH) batteries. NiMH batteries are capable of storing twice as much energy as NiCad batteries, which results in a duration of use almost twice as long as the NiCads. However, a major drawback of NiMH batteries is that during charging they are less tolerant to heat than NiCads and other rechargeable batteries. Charging a NiMH battery at elevated temperatures can potentially lead to destruction of the device, possibly resulting in damage to the battery charger. The sources of heat the battery is subjected to include the ambient temperature, the heat radiated from the battery charger during quiescent operation, the heat radiated from the battery charger while charging a battery, and the heat radiated by the battery during charging. The sensitivity of NiMH batteries to high temperatures demands that the battery charger design minimize the heat radiated during all operating modes.

Conventional battery chargers have been designed for use with NiCad and alkaline batteries. Since these types of batteries are not nearly as sensitive to heat during charging as NiMH batteries, there has not been the stimulus to create chargers that minimize radiated heat. Therefore, battery chargers that are designed for NiCad and alkaline batteries dissipate a significant amount of power resulting in relatively high assembly temperatures during battery charging. A significant portion of the dissipated power is generated in a portion of the circuit referred to as the bootstrap network. The amount of power dissipated in the bootstrap network is directly related to the level of the input voltage to the circuit. As the input voltage increases, the power dissipated in the bootstrap network increases. As a result of the power losses in bootstrap networks and the sensitivity of NiMH batteries to high temperatures, conventional chargers that are powered from a 115 Vac input source provide marginal operation when charging NiMH batteries. Moreover, charging NiMH batteries from conventional chargers that are powered from a 230 Vac input source, with their attendant high assembly power dissipation, can result in the destruction of the batteries being charged. The high temperatures associated with conventional chargers powered from 230 Vac thus makes them unsuitable for charging NiMH batteries.

There are two main circuit configurations that are employed for the internal design of battery chargers: constant current chargers and voltage switching chargers. Constant current chargers regulate the battery charging current by varying the impedance of a series pass device, essentially dissipating power in the pass device to maintain regulation. Due to the relatively high assembly power dissipation, constant current chargers are unsuitable for charging NiMH batteries and typically are used only for charging low capacity batteries. Voltage switching chargers generally have a switch in series with the input voltage source, an inductor, and the battery that is being charged. The switch is repetitively cycled, thereby applying the input voltage to the inductor which provides an averaged current to the battery. Both, constant current chargers and voltage switched chargers require a circuit to provide power from the input power source to drive the series pass device or the series switch. A majority of the losses in battery charger circuits occur in this circuit which is referred to as the bootstrap network. As the input voltage to the charger is increased the losses in the bootstrap network increase substantially. To minimize the power dissipated, the resistance of the network must be maximized. However, the resistance of the bootstrap network must be maintained low enough to provide sufficient power to operate the switching device. Therefore, there is a maximum limit on the resistance of the bootstrap network beyond which the battery charger circuit will not operate. Conventional battery chargers that have been designed with the maximum operable bootstrap network resistance continue to generate more heat than is acceptable for charging NiMH batteries. When operated from a 115 Vac input, or 155 Vdc input, conventional circuits provide marginal charging performance. When the input source is 230 Vac, or 300 Vdc, the heat generated from the bootstrap network losses can make conventional battery chargers unsuitable for charging NiMH batteries.

The present invention solves the excessive heat problem of conventional battery chargers by using a novel low dissipation bootstrap network. Whether powered from 155 Vdc or 300 Vdc, the invention significantly reduces the losses in the bootstrap network. The reduced power losses in the bootstrap network result in lower temperatures to which batteries under charge are exposed. The lower ambient temperatures permit reliable, optimum charging of NiMH batteries.

The present invention minimizes power dissipation in the bootstrap network by reducing reliance on the bootstrap network as the charge path for the local energy storage capacitor that provides power to the series switch. The input power is passed through a switching device which intermittently applies the input voltage to an output inductor. An auxiliary winding on the output inductor provides an isolated source of energy that is coupled back into the local energy storage capacitor. Coupling energy from the auxiliary winding reduces the amount of charge that must be provided through the bootstrap network, thereby permitting a larger bootstrap resistance to be selected. The larger bootstrap resistance minimizes losses in the network, reducing the overall battery charger heat generation, resulting in a lower battery charger operating temperature. Thus, the low power dissipation battery charger provides a low temperature environment for charging batteries.

In view of the above, it is a primary object of the present invention to provide a battery charger circuit that is capable of providing a reliable, inexpensive, low temperature environment for charging NiMH batteries.

It is a further object of the present invention to provide an inexpensive battery charger circuit that can operate from 300 Vdc, that is capable of providing the low temperature environment that is appropriate for recharging NiMH batteries.

It is yet another object of the present invention to provide a battery charger circuit in which the power dissipation of the assembly is minimized, thereby providing an energy efficient circuit for charging a variety of rechargeable batteries.

For a more complete understanding of the invention, its objects and advantages, reference may be had to the following specification and to the accompanying drawings.

DETAILED DESCRIPTION OF THE PREFERRED EMBODIMENT

Figure 1:
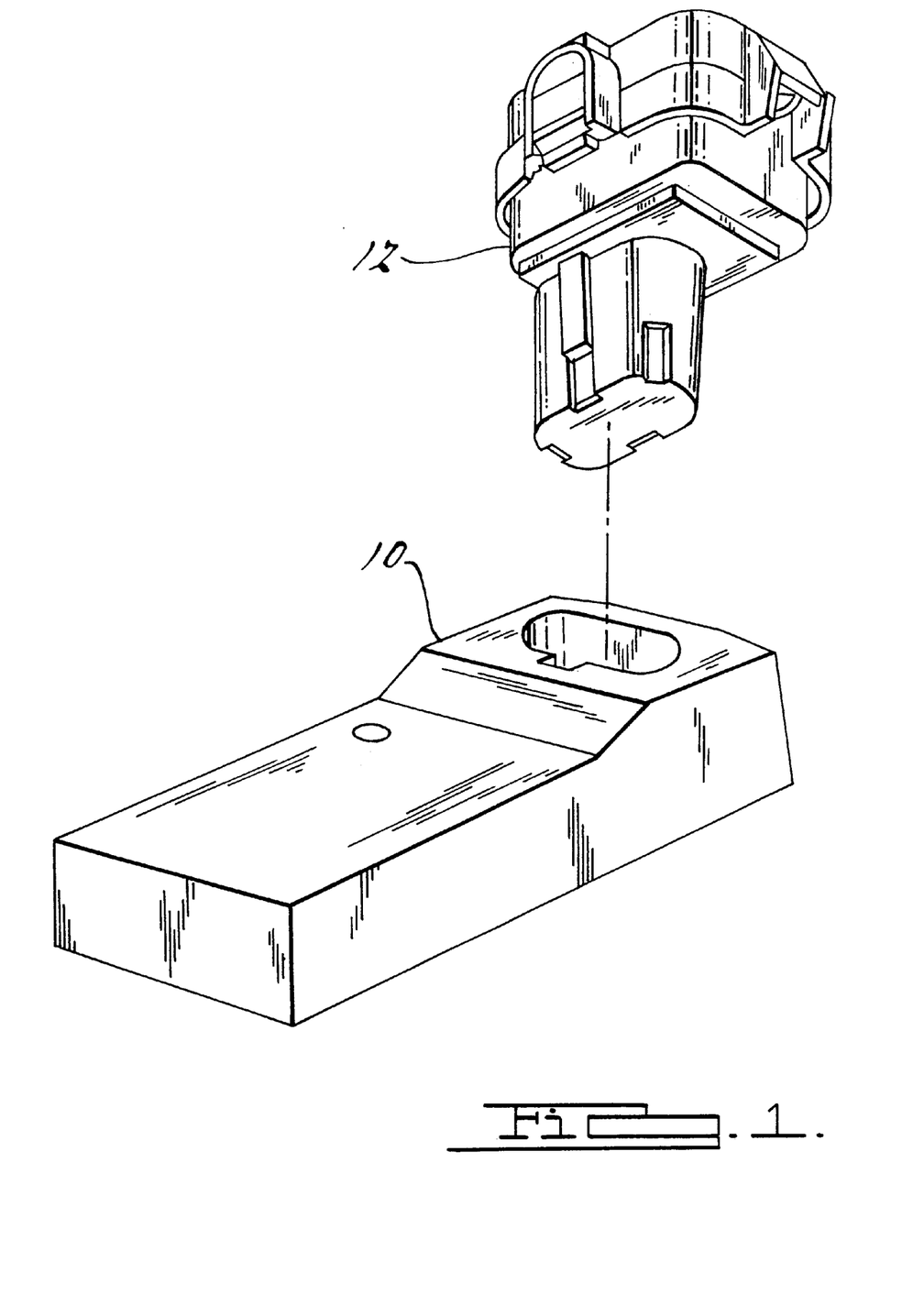
FIG. 1 is a three dimensional view showing a present embodiment of a low heat dissipation battery charger assembly.

Referring to FIG. 1, an exemplary high efficiency battery charger assembly 10 is illustrated. The battery charger assembly 10 is designed to convert either an unregulated AC voltage or a DC voltage to a current which can be used to charge battery 12. For example, the assembly 10 can convert an input of either 230 volts, 60 HZ AC or 115 volts, 60 HZ AC to a DC current that is appropriate for charging battery 12.

Figure 2:
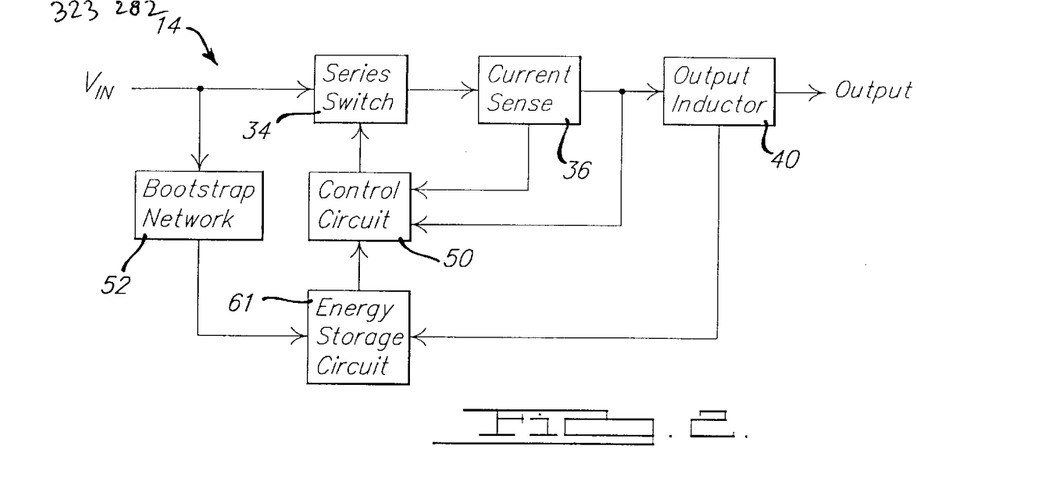
FIG. 2 is a block diagram illustrating a present embodiment of a low heat dissipation battery charger.

Referring to FIG. 2, an exemplary battery charger circuit 14 is illustrated. The presently preferred embodiment of battery charger circuit 14 is designed to convert a DC voltage to a regulated output current which is suitable for charging a battery. A power source provides the input voltage, Vin, which is fed to the series combination of series switch 34, current sense 36, and output inductor 40. An energy storage circuit 61 receives charge from output inductor 40 and bootstrap circuit 52. The output of energy storage circuit 61 supplies power to control circuit 50 which controls the operation of series switch 34 in response to an input from current sense 36. The series switch 34 remains on until the current through current sense 36 ramps up to a predetermined value, at which time the switch 34 is turned off. The switch 34 remains off until the current through current sense 36 ramps down to zero amps, at which time the voltage at the input to output inductor 40 rises to the battery voltage. The rising voltage at the input to output inductor 40 enables the control circuit 50, which once again causes the series switch 34 to turn on.

The described modulation scheme of the preferred embodiment employs a hysteretic version of variable frequency modulation with a maximum frequency of approximately 40 kilohertz. Both the ON time and the OFF time of the charger circuit 14 vary with changes in circuit operating conditions. The ON time of the charger circuit 14 varies inversely with changes in the input voltage and the OFF time varies inversely with changes in the output voltage. Although the preferred embodiment employs variable frequency modulation, the principles of the invention may be readily extended to a circuit employing pulse-width modulation. As is known in the art, pulse-width modulators control a circuit by operating at a fixed frequency and varying the pulse-width of the turn-on signal in response to a controlling input. On the other hand, a frequency modulator controls a circuit by varying the total period of the signal. This can be done by holding the on-time constant and varying the off-time, or holding the off-time constant and varying the on-time, or varying both the on-time and the off-time as is done in the preferred embodiment. The modulator used in the preferred embodiment is a also referred to as a hysteretic modulator.

Figure 3:
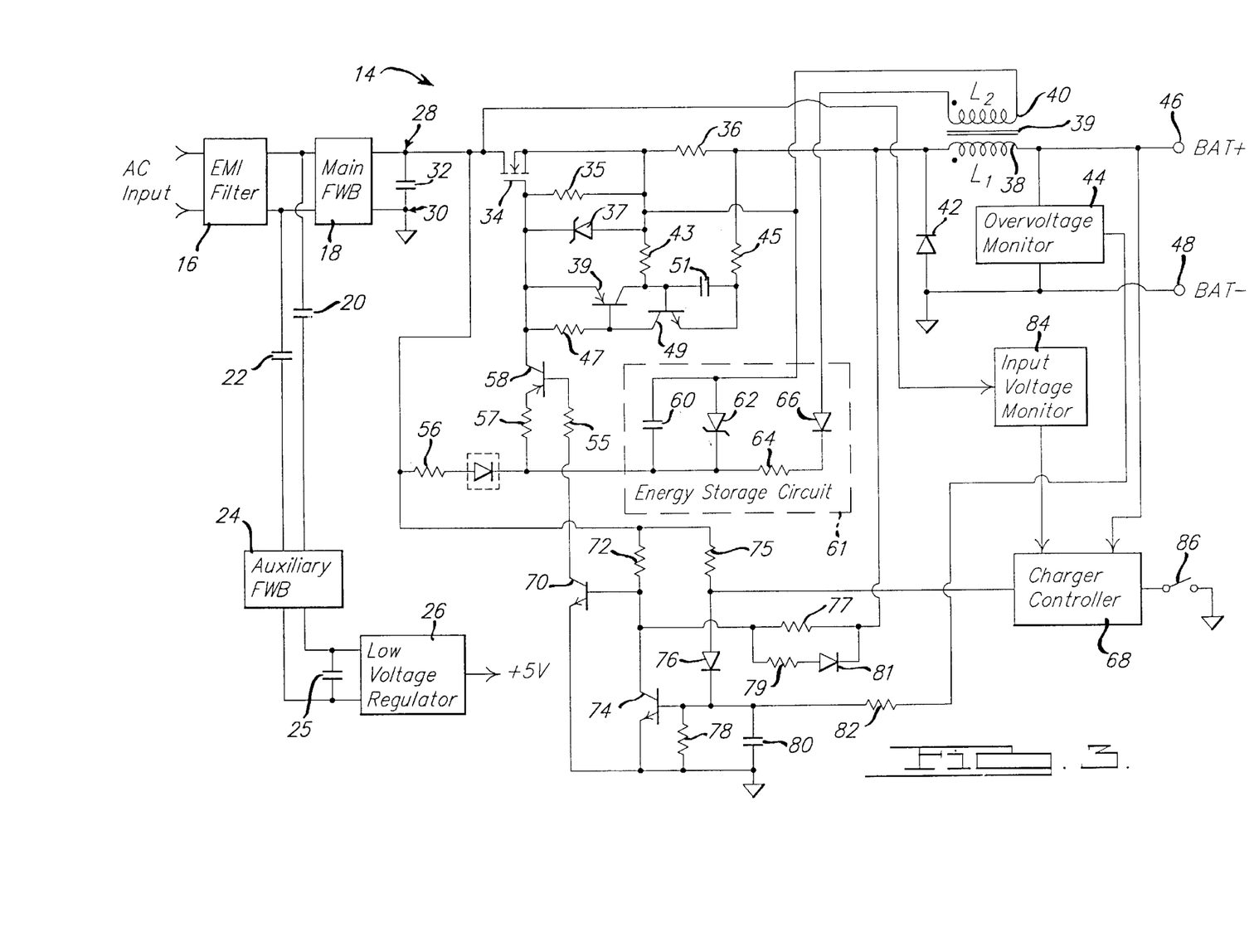
FIG. 3 is a schematic drawing of a present embodiment of a low dissipation heat battery charger.

FIG. 3 illustrated a detailed schematic of the battery charger circuit 14. The battery charger circuit 14 includes an AC voltage input connected to EMI filter 16. The output of EMI filter 16 connects to main full-wave bridge 18 and through AC decoupling capacitors 20 and 22 to auxiliary full-wave bridge 24. The output of auxiliary full-wave bridge 24 connects to voltage regulator 26 which supplies a regulated output voltage of plus 5 volts to the internal circuitry. The output of main full-wave bridge 18 is applied between high side line 20 and ground reference line 22. The rectified output voltage of main full-wave bridge 18 is filtered by input capacitor 32. The resulting filtered voltage is nominally 300 volts DC. The input capacitor 32 connects to series switch 34. In the preferred embodiment a power MOSFET is used as the series switch 34, although other devices could be used such as BJT's, IGBT's, and MCT's. The MOSFET acts as a voltage control switch; when it is in the ON state the impedance between the drain and source is low, permitting current to flow. When in the OFF state, the impedance between the drain and source is very high, effectively preventing current flow. The source of series switch 34 connects to current sense 36. A resistive current sense is employed in the present embodiment, however it is within the scope of the invention that other circuits could be used such as magneto-resistive circuits, Hall effect devices, and current mirror circuits. The other side of current sense 36 connects to the junction of freewheeling diode 42 and output inductor L1 38. Auxiliary inductor L2 40 is wound around L1 on the same core 39 such that the magnetic fluxlines from L1 couple to L2. Using a separate winding on core 39 permits energy to be diverted from inductor 40 to a circuit that is referenced to a voltage potential different from the rectified line voltage. Overvoltage monitor 44 and output terminals (BAT+) 46 and (BAT−) 48 connect from the output side of L1 38 to the ground reference line 22.

Energy storage circuit 61 includes the components required for intermediate energy storage for powering control circuit 50 and series switch 34. Within the energy storage circuit, L2 40 connects to the series combination of blocking diode 66 and resistor 64. The other side of resistor 64 connects to the cathode of zener diode 62 and capacitor 60 which is connected in parallel with zener diode 62. The anode of zener diode 62 connects to the other end of L2 40 and the source of MOSFET 34. The energy storage circuit 61 is referenced to the source of MOSFET 34 in order to provide gate drive power to MOSFET 34 during both the ON time and the OFF time. Although the preferred embodiment describes an energy storage circuit that uses a capacitor to provide intermediate energy storage, other device configurations and devices can be used, such as rechargeable batteries.

The control circuit 50 controls the turn-on and turn-off of series switch 34 in response to inputs from current sense 36, L1 40, and overvoltage monitor 44. Either side of current sense 36 connect respectively to resistors 43 and 45 which connect to transistors 39 and 49 which are arranged in a latch configuration. The emitter of PNP transistor 39 connects to the source of MOSFET 34 and the collector of PNP pass transistor 58. Resistor 47 connects across transistor 39 base-emitter junction. The base and collector of transistor 39 connect to the collector and base of NPN transistor 49. Filter capacitor 50 which provides low pass filtering connects from the base to the emitter of transistor 49. The parallel combination of resistor 35 and zener diode 37 connects across the MOSFET 34 gate-source junction. The resistor 35 provides a low impedance path during the turn-off period to ensure MOSFET 34 remains off and zener diode 37 protects the gate-source junction from overvoltage spikes. Pass transistor 58 controls the turn-on of MOSFET 34. The emitter of pass transistor 58 connects to gate resistor 57 which connects to the junction of bootstrap network 56, floating storage capacitor 60, the cathode of zener diode 62, and resistor 64. The other side of bootstrap network 56 connects to high side line 28. In the preferred embodiment the bootstrap network 56 comprises a single 2 watt resistor, however the scope of the invention includes other bootstrap networks such as a resistor and diode in series, a resistor-capacitor series combination in parallel with a resistor, a resistor in series with an inductor, and a current regulator diode either singly or combined with the listed combinations.

Controlling the operation of pass transistor 58 is a set of components referenced to circuit ground. Inputs to the circuit from the output of charger controller 68, the output of overvoltage monitor 44, and the cathode of free-wheeling diode 42 are processed and level-shifted to control the operation of the high-side referenced series switch 34 through pass transistor 58. The collector of NPN transistor 70 connects to resistor 55 which is connected to the base of pass transistor 58. Pull-up resistor 72 connects from high-side line 28 to the junction of transistor 70 base, NPN transistor 74 collector, resistor 77, and speed-up resistor 79 which is in series with diode 81. The other side of resistor 77 connects to the cathode of diode 81 and free-wheeling diode 42 cathode. Resistor 75 also connects between high-side line 28 and the anode of diode 76. The junction of resistor 75 and diode 76 connects to charger controller 68 which enables or disables battery charger circuit 14 in response to inputs such as input voltage monitor 84, (BAT+) 46, battery 12, ambient temperature, and the assembly on/off switch 86.

Charger controller circuits wherein the input voltage, battery characteristics, and ambient temperature are monitored are well known in the art. The cathode of diode 76 connects to the junction of resistor 78, capacitor 80, resistor 82, and the base of NPN transistor 74. The other side of resistor 82 connects to overvoltage monitor 44 which will disable battery charger circuit 14 in response to an output overvoltage. Overvoltage monitor circuits are also well known in the art, and are typically implemented using zener diodes or an internal circuit reference voltage in combination with buffering comparators or resistors. On/off switch 86 connects from charger controller 68 to ground reference line 30. Resistor 78, capacitor 80, and the emitters of transistors 70 and 74 also all connect to ground reference line 30.

The battery charger circuit 14 has two modes of operation, standby and charging. In standby mode an AC input voltage is applied, however the assembly on/off switch 86 is set OFF preventing the assembly from charging the battery 12. Referring to FIG. 3, during standby an AC input voltage of approximately 230 Vac is present and capacitor 32 is charged to about 300 volts DC. Input voltage monitor 84 senses the input voltage and provides a logic level HI signal to charger controller 68. However, on/off switch 86 is set LO causing charger controller to set output 67 open, thereby disabling battery charger circuit 14 by turning transistor 74 on, transistor 70 off, pass transistor 58 off, and series switch 34 off. Although the main charging path through series switch 34 is disabled, a trickle current does flow to the battery through an alternate path. Energy from the AC input and capacitor 32 flows through bootstrap network 56, energy storage circuit 61, current sense 36, L1 38 and into battery 12. Within the energy storage circuit 61 the trickle current flows through floating storage capacitor 60 until the voltage potential of the capacitor equals the clamping voltage of zener diode 62 at which time current diverts through the zener 62. Power dissipation during standby mode is centered about bootstrap network 56 with a minimal amount of power dissipated in low voltage regulator 26, charger controller 68, and zener diode 62. The power dissipation in bootstrap network 56 when a resistor is used is described by the following equation:

$$Pdiss = [Vin - Vz - Vbat]^2 / R_b.$$

Where the variables; Vin, Vz, Vbat, and $R_b$ represent respectively, input voltage, clamping voltage of zener diode 62, battery 12 voltage, and bootstrap network resistance. Only the value $R_b$ can be varied, wherein the values of Vin, Vz, and Vbat are dictated by the circuit constraints. Maximizing the value of $R_b$ minimizes the dissipated power, however it also restricts the amplitude of the current that charges floating storage capacitor 60 during initial turn-on as well as during charge mode.

Figure 4:
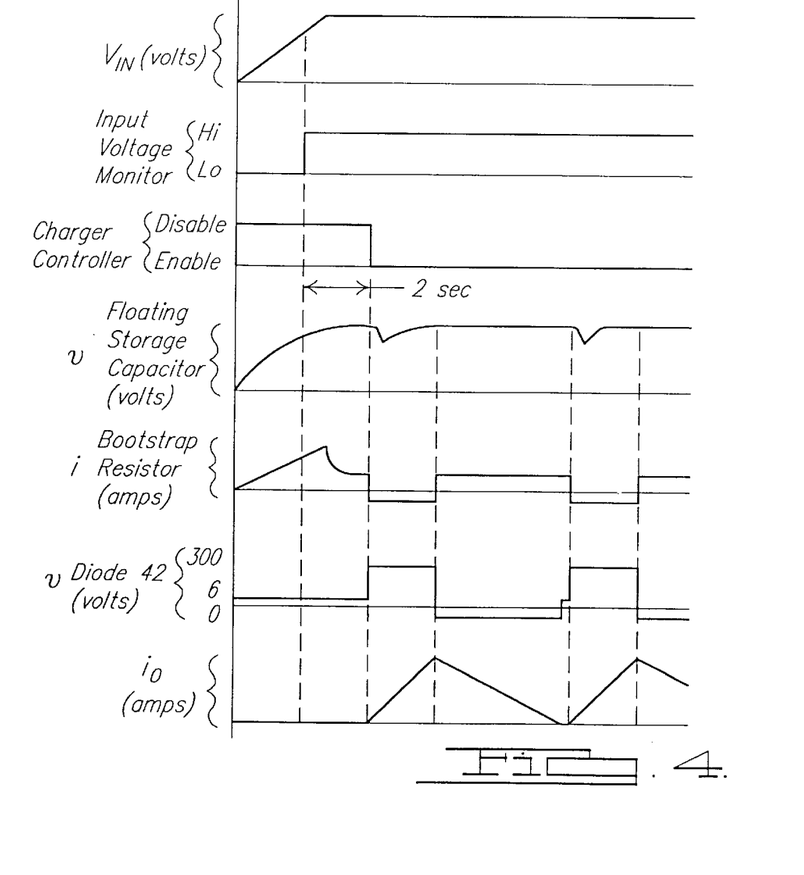
FIG. 4 is a signal diagram showing the current and voltage waveforms associated with the charging mode operation of the illustrated battery charger circuit of FIG. 3.

With additional reference to FIG. 4, the operation of charge mode is illustrated. At initial turn-on of battery charger circuit 14, AC voltage is applied to EMI filter 16. The AC voltage from EMI filter 16 passes through AC decoupling capacitors 20 and 22, is rectified by auxiliary full-wave bridge 24, filtered by low level filter capacitor 25, and regulated to approximately 5 VDC by low voltage regulator 26. The 5 VDC comes into regulation at an AC input voltage of approximately 100 volts. The 5 VDC powers the internal circuitry of battery charger 14. The output of EMI filter 16 also is applied to the main full-wave bridge 18, which rectifies the voltage and applies it across input capacitor 32. When input capacitor 32 initially begins to charge, MOSFET 34 is in the off state and charger controller 68 commands transistor 74 to disable the battery charger circuit 14. When the voltage across input capacitor 32 exceeds 100 volts the output of input voltage monitor 84 transitions HI, the charger controller 68 then begins a turn-on delay of about 2 seconds, at the end of which the charger controller 68 turns transistor 74 on. The delay before enabling the series switch 34 is to allow the floating storage capacitor 60 to charge to a nominal value of 18 volts. Although a turn-on delay is employed in the preferred embodiment, a circuit monitoring the voltage level of storage capacitor 60 is within the scope of the invention. It is merely sufficient that the employed turn-on method prevents the series switch 34 from being turned on until there is sufficient energy available to ensure that the series switch remains fully on, not in the active region, during the entire on time. As the voltage across input capacitor 32 begins to rise current flows through bootstrap network 56, floating storage capacitor 60, current sense resistor 36, output inductor L1, and the battery 12, before returning to ground reference line 30. As the charging current flows through floating storage capacitor 60, the capacitor voltage gradually increases toward a nominal value of 18 volts. Input capacitor 32 continues to charge until it attains a nominal steady state voltage of approximately 300 volts DC. Current continues to flow through bootstrap network 56 and storage capacitor 60 until the capacitor attains a nominal value of 18 volts. Current then flows from charging resistor 56 through zener diode 62, current sense resistor 36, L1, and the battery 12. When the turn-on delay is completed the charger controller 68 turns transistor 74 off, transistor 70 on, and pass transistor 58 on. Charge from storage capacitor 60 flows through gate resistor 57 and pass transistor 58 into the gate of MOSFET 34, charging up the gate source capacitance, and then returns to storage capacitor 60. MOSFET 34 begins to turn on as the gate-source voltage reaches the threshold value of 4 volts. As MOSFET 34 turns on the source voltage transitions from the battery voltage to a value approaching the value of the voltage across the input capacitor 32. As the source voltage of MOSFET 34 increases, storage capacitor 60 remains referenced to the source and thereby provides the energy required to maintain the gate source voltage of MOSFET 34 during the remainder of the on state.

When MOSFET 34 is in the on state, the voltage from input capacitor 32 is impressed on the input of output inductor 38, reverse biasing freewheeling diode 42. The voltage across output inductor 38 during the on state is equal to the voltage across input capacitor 32 minus the voltage across battery 12. The positive voltage across output inductor 38 causes current through inductor 38 to increase at a linear rate. However, there is an additional component to the current waveform due to auxiliary inductor 40 which is wound on the same core.

Figure 5:
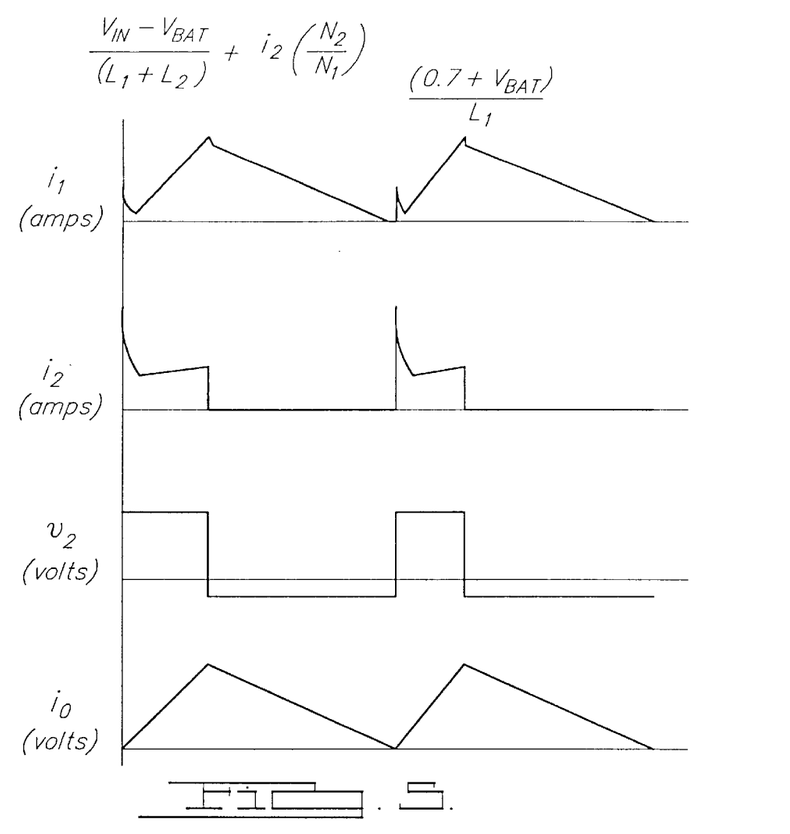
FIG. 5 is a signal diagram showing the current and voltage waveforms associated with coupling energy from the output inductor to the energy storage circuit of the illustrated battery charger circuit of FIG. 3.
Figure 6:
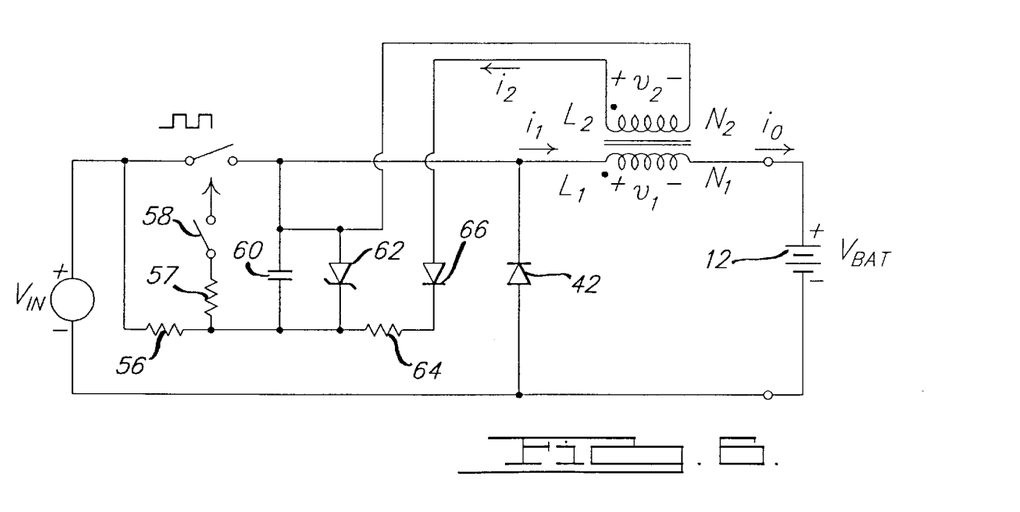
FIG. 6 is a schematic drawing of circuitry associated with coupling energy to the energy storage circuit of a present embodiment of the invention.

With reference to FIG. 6 and waveform $i_2$ of FIG. 5, the current flowing through auxiliary inductor 40 is illustrated. At the beginning of the turn on cycle the voltage across L1 38 is reflected across L2 40. The turns ratio between L1 38 and L2 40 is selected to provide a voltage across L2 of slightly more than 18 volts. The voltage that L2 is designed to produce is related to the gate-source breakdown voltage of the series switch 34. In the preferred embodiment the maximum voltage permitted across the gate-source of MOSFET 34 is 20 volts. Therefore, selecting a turns ratio that provides a voltage level of 18 volts ensures the MOSFET 34 is not damaged by a gate-source junction overvoltage, while ensuring that MOSFET 34 still turns on quickly as the gate-source voltage rapidly transitions past the threshold voltage of 4 volts. Current flows from L2 14 through blocking diode 66 and resistor 64 then splits, with a portion flowing through the pass transistor 58 into the gate-source junction of MOSFET 34 and the remainder flowing through the parallel combination of storage capacitor 60 and zener diode 62. The energy supplied from inductor L2 40 to maintain MOSFET 34 in the on state reduces the need for energy flowing through bootstrap network 56. Therefore, the value of resistance that can be selected for the bootstrap network 56 of the present embodiment is significantly higher than the resistance in conventional battery charger bootstrap networks. As noted earlier, the higher the value of the bootstrap network resistance, the lower the dissipated power in the bootstrap network 56. The power dissipated during this mode of operation consists of the power dissipated in charging resistor 56, zener diode 62, and resistor 64. During the on-time a negligible amount of current will flow back from resistor 64 through bootstrap network 56. Although, in the present embodiment L2 is wound such that current from L2 is supplied to energy storage circuit 61 during the on-time, it is within the scope of the invention that L2 be wound such that current from L2 is supplied during the off-time. This would merely entail storing the energy supplied by L2 from a previous off-time for use during a subsequent on-time.

Again referring to FIGS. 3 and 4, MOSFET 34 remains in the ON state until the slowly rising current flowing through current sense 36 causes a voltage drop of approximately 0.7 volts. The latch circuit comprising transistors 39 and 49 then becomes active, shorting the gate to source junction of MOSFET 34, causing it to turn off. The 0.7 volt drop turns on transistor 49 which draws base current from transistor 39 causing it to turn on. Current from the collector of transistor 39 flows into the base of transistor 49 keeping it on until the source of current to transistor 39 is eventually terminated. When the MOSFET 34 is switched to the off state, it presents a high impedance to the voltage from input capacitor 32 decoupling it from the output inductor 38. During this period freewheeling diode 42 is active. The current from output inductor 38 which previously flowed through MOSFET 34 now flows through freewheeling diode 42. With diode 42 conducting, the voltage at the input to output inductor 38 is approximately one diode drop below ground reference line 30. The voltage across output inductor 38 is equal to negative 1 volt minus the voltage of the battery 12. The negative voltage across inductor 38 causes current through inductor 38 to decrease at a linear rate. The voltage across output inductor 38 reflects across the windings to auxiliary inductor 40 (see FIG. 5). The negative voltage across L2 40 is decoupled from the energy storage circuit by blocking diode 66, effectively preventing current flow from auxiliary inductor 40.

Returning to FIGS. 3 and 4, when the voltage at the input to output inductor 38 drops to minus 1 volt, current flowing through resistor 72 into the base of transistor 70 is shunted through resistor 79 and diode 81 causing transistor 70 to turn off. Pass transistor 58 then turns off preventing latch circuit 50, which became active when the voltage drop across current sense 36 exceeded 0.7 volts, from discharging storage capacitor 60. When pass transistor 58 turns off, latch circuit 50 is reset to the unlatched, inactive state. Gate source resistor 35 provides a low impedance path to maintain MOSFET 34 in the off state.

The current through freewheeling diode 42 and output inductor 38 continues to decrease until it reaches 0 amps. With no current flowing through freewheeling diode 42 the input to the output inductor 38 rises to the voltage of battery 12. When the voltage at the input to output inductor 38 exceeds approximately 2 volts, transistor 70 turns on, which in turn draws base current from pass transistor 58 causing it to turn on. Current from storage capacitor 60 once again flows through pass transistor 58 charging the gate source capacitance of MOSFET 34, turning MOSFET 34 on. The charger 14 will continue to cycle from ON to OFF until the charger controller 68 commands transistor 74 to disable circuit operation. From the foregoing it will be understood that the invention provides a the capability of a low dissipation battery charger that is suited for use with either a 230 Vac or a 300 Vdc source for recharging NiMH batteries. The reduced power dissipation associated with the invention results in a lower temperature charging environment for batteries being charged. Additionally, the circuit can be employed for minimizing the power dissipation of all types of battery chargers that are powered from a range of input voltages extending to and exceeding 300 Vdc. Also, by reducing the temperatures to which batteries are subjected, the circuit improves the charging capabilities of battery chargers powered from either 115 Vac or 155 Vdc.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A battery charger circuit for charging a battery from a power source, the circuit comprising:
    an inductor including a main winding and an auxiliary winding;
    a series switch operative in open and closed states connected in series with the power source and said main winding of said inductor;
    an energy storage circuit connected to said auxiliary winding of said inductor for storing energy to be used for controlling said series switch;
    a bootstrap network connected from the power source to said energy storage circuit for providing energy; and
    a control circuit that controls said series switch such that a supply voltage from the power source is intermittently applied to said inductor for providing a charging current to the battery.

2. The battery charger circuit of claim 1 further comprising a sensor for monitoring a circuit operating parameter, wherein said control circuit employs a modulation scheme to control said series switch in response to the sensor.

3. The battery charger circuit of claim 2 wherein said sensor is selected from the group of: Hall effect current sensors, resistive shunt current sensors, magneto-resistive current sensors, battery temperature sensors, and battery voltage sensors.

4. The battery charger circuit of claim 2 wherein said modulation scheme is a hysteretic technique.

5. The battery charger circuit of claim 1 wherein said series switch is a MOSFET.

6. The battery charger circuit of claim 1 further comprising a voltage clamping device in parallel with said energy storage circuit.

7. The battery charger circuit of claim 1 wherein said bootstrap network comprises a high impedance circuit for limiting the amount of energy supplied through said network to said energy storage circuit.

8. The battery charger circuit of claim 1 wherein said bootstrap network comprises a resistor.

9. The battery charger circuit of claim 8 wherein said bootstrap network further comprises a diode in series with said resistor.

10. The battery charger circuit of claim 1 wherein said inductor main winding and auxiliary winding are wound such that current flows through said auxiliary winding during the closed state of the series switch.

11. The battery charger circuit of claim 1 wherein said auxiliary winding of said inductor provides a low voltage energy source to said energy storage circuit.

12. A battery charger circuit for charging a battery from a high voltage power source comprising:
    a chopper circuit connected in series between the power source and the battery for providing a controlled charging current to the battery, said chopper circuit including a switching device, a control circuit for controlling the conductive state of the switching device, and an output inductor having a primary winding and an auxiliary winding;
    an energy storage circuit connected to said control circuit for storing energy that is supplied by said control circuit to said switching device to control the conductive state of said switching device;
    a high impedance bootstrap network connected between the power source and said energy storage circuit for providing a first high voltage source of energy to said energy storage circuit; and
    said energy storage circuit being further connected to said auxiliary winding of said output inductor for providing a second low voltage source of energy to said energy storage circuit.

13. The battery charger circuit of claim 12 wherein said inductor main winding and auxiliary winding are wound such that current flows through said auxiliary winding when current is ramping up through said main winding.

14. The battery charger circuit of claim 12 further comprising a sensor for monitoring a circuit operating parameter, wherein said control circuit employs a modulation scheme to control said series switch in response to the sensor.

15. The battery charger circuit of claim 12 wherein said switching device is a MOSFET.

16. The battery charger circuit of claim 12 wherein said energy storage circuit comprises a capacitor in parallel with a voltage clamping device.

17. A battery charger circuit for charging batteries from a power source having a first terminal and a second terminal, the circuit comprising:
    an output inductor including a main winding and an auxiliary winding;
    a first switching device operative in open and closed states, having a control input;
    a current sense resistor connected in series with the main winding of the output inductor, the first switching device, and the first terminal of the power source;
    a first junction formed at the connection of the first switching device and the main winding of the output inductor;
    a first device for providing a unidirectional current path connected from the second terminal of the power source to the first junction;
    an energy storage circuit comprising;
        a diode and the auxiliary winding of the output inductor coupled in series and connected in parallel with an energy storage capacitor;
    a control circuit comprising;
        a second switching device connected from the energy storage circuit to the first switching device, the second switching device for supplying turn-on energy to the control input of the first switching device;
        a second junction formed at the connection of the energy storage circuit and the second switching device; and
        a latch circuit connected to the current sense resistor and the first switching device; and
    a bootstrap resistor connected from the first terminal of the power source to the second junction, the bootstrap resistor for providing a charging path for current flowing into the energy storage circuit;
    whereby, energy from the auxiliary winding of the inductor flows into the energy storage capacitor reducing the quantity of charge that must be supplied through the bootstrap resistor to the energy storage circuit.

18. A method of charging a battery from a power source with a circuit having a switch and an inductor connected in series, said method comprising:

supplying energy from the power source to an energy storage circuit through a bootstrap network;

powering a control circuit with energy from the energy storage circuit;

generating a control signal with the control circuit;

transmitting the control signal to the switch, thereby intermittently applying the supply voltage to the inductor;

generating a time-varying current through the inductor in response to the application of the supply voltage; and coupling energy from the inductor into the energy storage circuit for supplementing the energy provided through the bootstrap network;

whereby coupling energy from the inductor into the energy storage circuit reduces the quantity of energy that must be provided through the bootstrap network resulting in lower circuit power dissipation.

19. The method of claim 18 further comprising the steps of;

producing a maximum reference current level;

receiving a current sense signal that is representative of the inductor current;

determining whether the inductor current is greater than the maximum reference current level; and responsively controlling the switch based upon the current sense signal.

* * * * *